Figure 1:
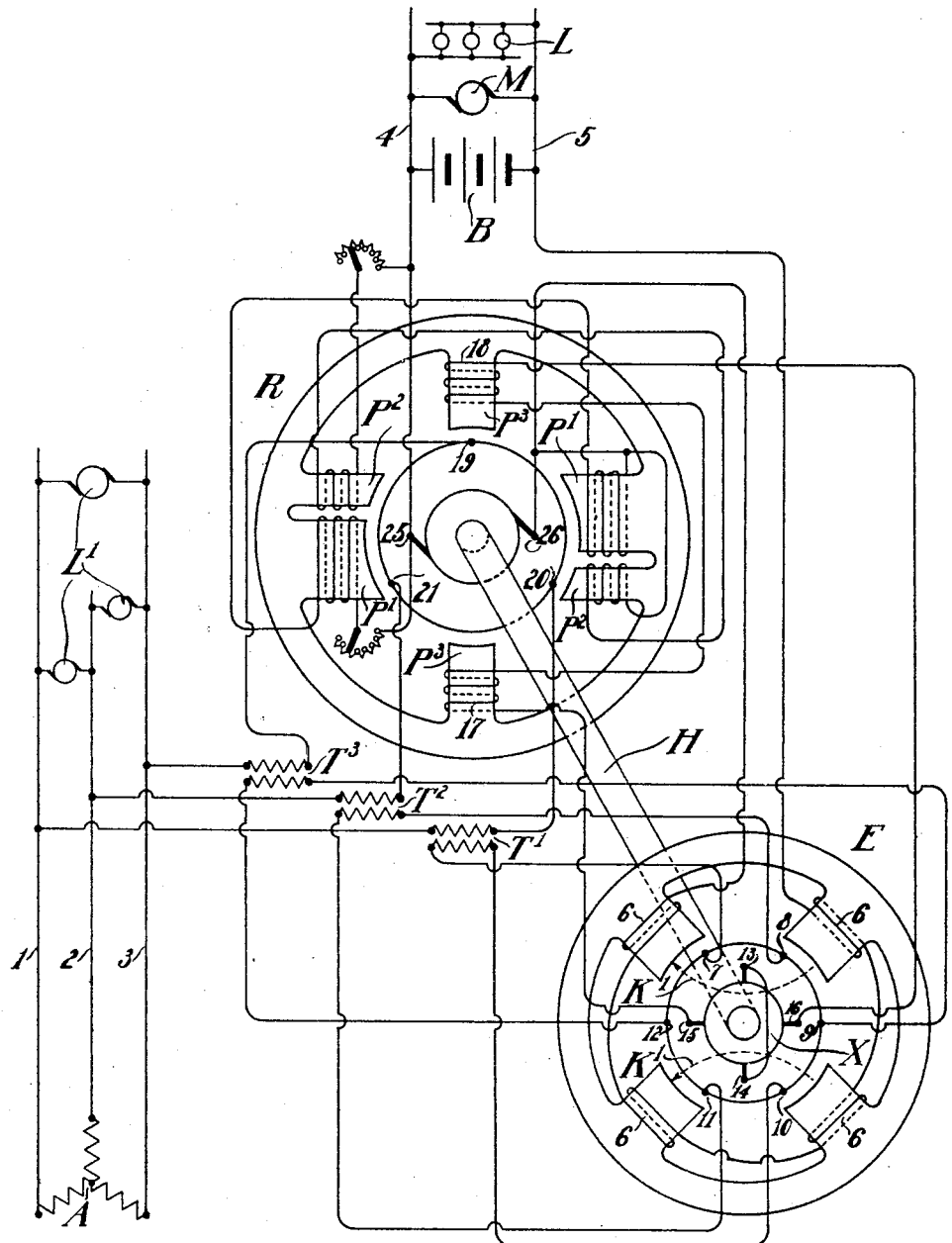

UNITED STATES PATENT OFFICE.

JOSEPH LESTER WOODBRIDGE, OF PHILADELPHIA, PENNSYLVANIA.

MEANS FOR EXCITING THE COMMUTATING-POLES OF A DYNAMO-ELECTRIC MACHINE.

1,130,686. Specification of Letters Patent. Patented Mar. 2, 1915.

Application filed June 8, 1912. Serial No. 702,428.

*To all whom it may concern:*

Be it known that I, JOSEPH LESTER WOODBRIDGE, a citizen of the United States, and a resident of Philadelphia, State of Pennsylvania, have invented certain new and useful Improvements in Means for Exciting the Commutating-Poles of a Dynamo-Electric Machine, of which the following is a specification.

My invention relates to dynamo electric machines in which both alternating currents and direct currents are delivered to or received from the same armature, and in which commutating poles are employed to produce sparkless commutation. Synchronous converters or double current generators adapted to deliver both alternating and direct currents from the same armature may be mentioned as examples. My invention is equally applicable whether the armature of the machine has a single winding connected to a commutator and to collector rings, or has two windings, one of which is connected to the commutator and the other to the collector rings. My invention is particularly applicable to those cases in which the alternating currents and the direct currents, which are carried by the armature windings, do not bear a fixed relation to each other.

In a synchronous converter, as ordinarily operated, the direct current output is directly proportional to the energy component of the alternating current input. The armature reactions of these two currents practically neutralize each other. In designing a commutating pole for such a machine, it is, therefore, only necessary to provide excitation sufficient to develop the commutating flux necessary to reverse the current in the coil which is passing under the brush, and no additional excitation to compensate for armature reaction is required. The commutating flux required is practically proportional to the direct current output, and a series winding carrying this output, or a current proportional thereto, will give satisfactory results. In the double current generator, and in special types of synchronous converters, these conditions do not exist, and the armature reaction of the alternating current and the direct current do not cancel each other, and these currents are not proportional to each other. In such cases it is necessary to provide additional excitation on the commutating poles to balance the armature reaction, and inasmuch as this armature reaction is not proportional to the direct current output a series winding will not give the desired results. As examples of machines in which these conditions of unbalanced armature reaction occur may be mentioned the split pole converter and the synchronous converter which in addition to its function as a converting device between alternating currents and direct currents is operating as a motor to deliver mechanical energy from its shaft, as, for example, to a booster mechanically driven by the shaft of the converter. In order to provide suitable excitation for the commutating poles of such machines I propose to provide means for exciting these poles with currents proportional to the algebraic sum of the direct current input or output from the DC brushes and that component of the alternating current input or output whose armature reaction is in line with the commutating poles.

Figure 2:
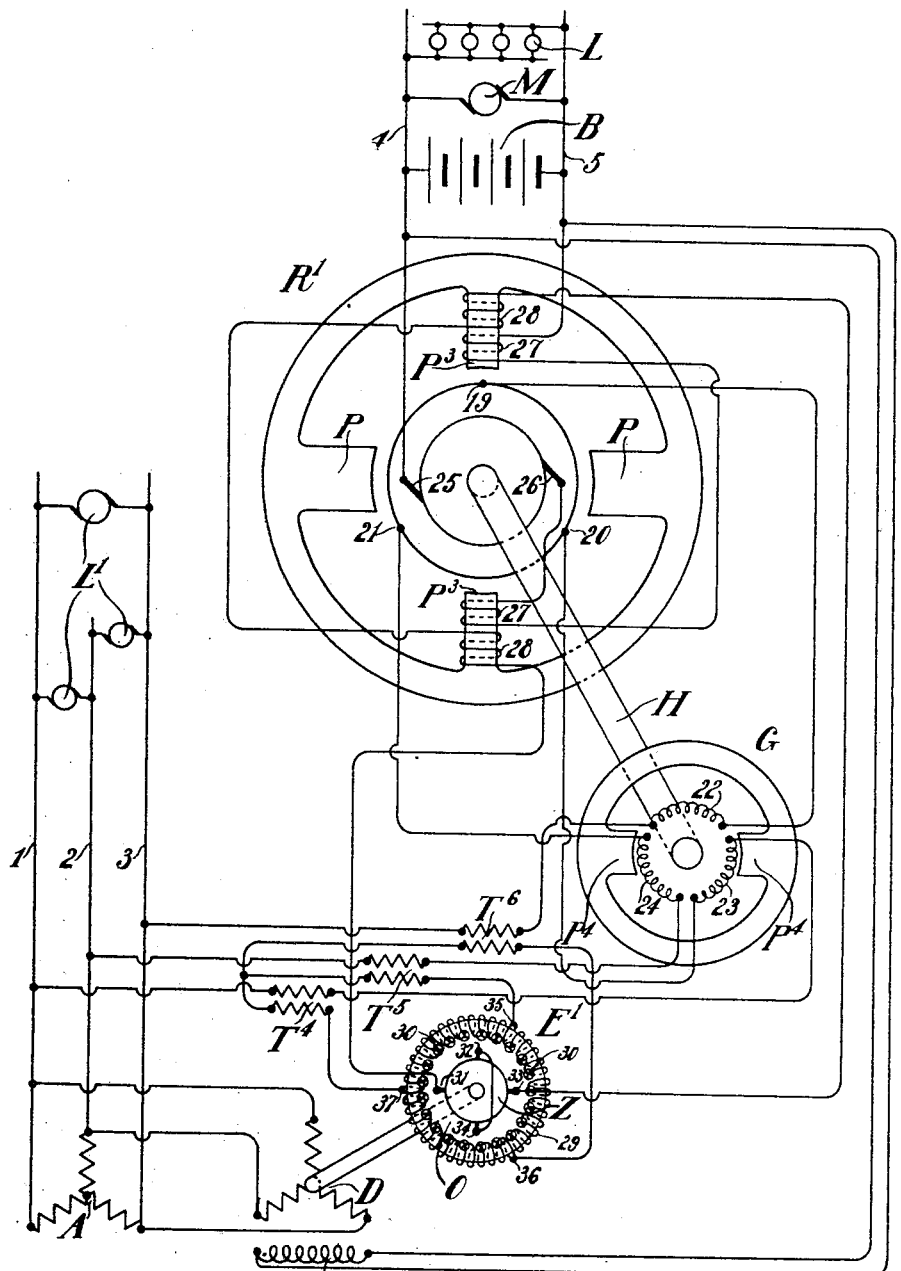

My invention will be more clearly understood by reference to the following description taken in connection with the accompanying drawings, in which, Figure 1 is a diagrammatic view illustrating features of my invention in connection with a split pole converter, while Fig. 2 illustrates features of the invention modified as to some of the details and applied to a synchronous converter driving an alternating current booster.

Referring to Fig. 1, A is a source of three phase alternating current supplying the circuit 1, 2, 3 to which are connected translating devices $L^1$. 4, 5 is a direct current circuit to which are connected the storage battery B, and translating devices such as the motor M and lamps L. R is a rotary converter of the split pole type connected between the alternating current circuit and the direct current circuit. 25 and 26 are the direct current brushes of this machine, and 19, 20 and 21 indicate the points in the armature winding from which taps are taken for connection to the alternating current circuit. It will be understood that these latter connections are made in the usual manner by means of slip rings which have been omitted from the drawing in order to avoid confusion. The main poles $P^1$ of the converter R and the regulating poles $P^2$, as here shown, are excited by independent circuits connected across the circuit 4, 5 with rheostatic control. It will be understood, however, that any of the well known manual or automatic methods of exciting these poles may be adopted. The commutating poles P³ of this machine are excited by windings 17 and 18 which are connected in series across the main brushes 15, 16 of the exciter E. This exciter is, in general, similar to that described in my Patent No. 870,150 and is so designed as to furnish current to the windings 17 and 18 which is proportional to the difference between the direct current output of the converter R and the alternating current input. This result is accomplished by reason of the special design of the exciter E as follows: The armature winding of this machine is connected to a commutator X and also has six-phase taps at the points 7, 8, 9, 10, 11 and 12. These latter points are connected diametrically to the secondary windings of three current transformers T¹, T² and T³ whose primary windings are connected in series with the alternating current leads of the converter R. By this means alternating currents proportional to the alternating current input to the converter R are passed through the armature winding of the exciter E, and if the armature were stationary these currents would produce a rotating field in said armature. This armature, however, is mounted on shaft H of the converter R, and thereby rotated in the opposite direction to that of the induced field rotation, thus producing a field which is stationary in space in the direction of the arrows K¹. The poles of the exciter E are provided with a winding 6 connected in series with one of the direct current leads of the converter R, this winding being so connected as to produce a field in the opposite direction to the arrows K¹. The direct current output of the exciter E taken from the brushes 15, 16 will also produce an armature reaction in the direction of the arrows K¹ and opposed to the excitation produced by the windings 6. Under normal conditions of operation these three sources of field excitation, namely, the AC input from the current transformers T¹, T² and T³, the DC excitation in the windings 6 and the DC armature reaction from the brushes 15 and 16 will nearly balance each other, leaving a small residuum which will produce a field flux in the line of the arrows K¹, thereby producing a small electro-motive-force across the brushes 13 and 14. These brushes are short-circuited so that this electro-motive-force will produce an appreciable flow of current which, by reason of the armature reaction, will produce a field at right angles to the arrows K¹, and an electro-motive-force between the brushes 15 and 16 sufficient to produce the required flow of current in the windings 17 and 18. As explained above, this flow of current will always be such as to produce approximate equilibrium between the three sources of field excitation in the exciter E, that is, it will be equal to the difference between the AC input from transformers T¹, T² and T³ and the DC excitation in the windings 6. Inasmuch as this latter is proportional to the DC output of the converter R, the resultant flow of current in the windings 17 and 18 will be proportional to the difference between the AC input and the DC output of the converter R, and will, therefore, be suitable for giving the excitation to its commutating poles.

One of the peculiar features of the split pole converter R is the fact that when the excitation of the regulating poles P² is altered in order to change the ratio between AC and DC electro-motive-force, the mean line of the total field flux is shifted in one direction or the other, followed by a shift in the phase position of the armature. This shifts the axis of the AC armature reaction, so that if before the shift the entire alternating current were effective as a factor in determining the excitation for the commutating poles, after said shift only one component of this alternating current will be thus effective. By mounting the armature of the exciter E on the shaft of the converter, or by driving it in any other way mechanically from the shaft, this shift of phase position in the converter will be followed by a corresponding shift in phase position in the exciter, so that the same component of the alternating current, which is effective in the converter R, will also be effective in the exciter E.

In Fig. 2 instead of a split pole converter, there is shown a standard converter R¹ with an alternating current booster G mounted on its shaft. This booster is provided with 3 phase armature windings 22, 23 and 24 connected in series between the AC circuit 1, 2, 3 and the armature of the converter R¹. It will be understood that the main poles P of the converter R¹, as well as the poles P⁴ of the booster G, may be excited by anw of the well known means either manually controlled or automatic, but in order to simplify the drawing no windings have been shown on these poles. The commutating poles P³ of the converter R¹ are each provided with two windings. One of these windings 27 is connected in series with one of the direct current leads of the converter. The other winding 28 is supplied with current from the exciter E¹. This latter is different in design from the exciter E shown in Fig. 1, but is similar to the machine described in my Patent No. 870,149. It consists of a magnetic circuit O, all parts of which are relatively fixed, upon which is wound a winding 29 similar to an armature winding and threaded through openings 30 in the magnetic circuit. No external stationary field circuit is provided. The machine $E^1$ is driven by the synchronous motor D connected to the circuit 1, 2, 3 whose field is shown at F. The commutator Z is connected to the winding 29 in the usual manner, and on this commutator bear 4 brushes 31, 32, 33 and 34. Brushes 32 and 34 are short circuited, while brushes 31 and 33 are connected to the winding 28 on the commutating poles of the converter $R^1$. The winding 29 is also connected at 3 points 35, 36 and 37 by means of suitable slip rings, not shown in the drawing, to the secondaries of 3 current transformers $T^4$, $T^5$ and $T^6$, whose primaries are connected into the alternating current leads of the converter $R^1$. The alternating current thus introduced into the winding 29 will produce a field which is held stationary in space by the rotation of the motor D. This field will be in the direction to produce an electro-motive-force across the brushes 32 and 34. The flow of current through the short circuit between these brushes will produce a field at right angles to the first, and an electro-motive-force across the brushes 31 and 32, which will send current of the desired value through the windings 28. This latter current will be substantially proportional to the alternating current from the transformers $T^4$, $T^5$ and $T^6$, and, in fact, will nearly equalize the effects of these latter currents in the exciter $E^1$, leaving a small residuum sufficient to produce the necessary flow of current across the short circuited brushes. It will be seen, therefore, that the total excitation of the commutating poles $P^3$ is proportional to the difference between the direct current output and the alternating current input of the converter $R^1$. If the apparatus is properly designed, the excitation of these poles will, therefore, be suitable for producing sparkless commutation regardless of the proportion of the AC input and the DC output. In the case of the standard converter shown in Fig. 2 there is no shifting of the mean line of the field flux, and it is, therefore, not necessary to provide for this phenomenon in driving the exciter $E^1$. A synchronous motor drive will, therefore, be suitable in this case.

Having described my invention what I claim and desire to secure by Letters Patent is, 1. In combination, an armature having both alternating current and direct current external connections, a commutating pole for said armature, means responsive to both the alternating and the direct current flow through said connections for exciting the commutating pole, main poles for said armature and means for developing in said main poles a field flux independent of the flux in said commutating pole.

2. In combination, converting apparatus including a field structure and its correlated armature whereof the field structure is provided with commutating poles and their windings, and the armature is provided with alternating current and direct current terminals, means for furnishing to said commutating poles excitation proportional to the combined flow of direct current and alternating current to or from said terminals respectively, said means including a synchronously driven exciter provided with an armature winding and its commutator, means for supplying to said armature winding alternating currents proportional to the alternating current flow at the alternating current terminals of the converting apparatus, and two sets of brushes for the commutator whereof one set is connected to windings on the commutating poles of the converting apparatus and the other set is interconnected by an independent conducting circuit.

3. In combination, a synchronous converter of the split-pole type having main poles, regulating poles and commutating poles with their appropriate windings, alternating current and direct current leads for said converter, and exciter for the commutating poles including an armature winding and its commutator, current transformers having their primary windings connected into the alternating current leads of the converter and their secondary windings connected to the armature winding of the exciter, two sets of brushes for the exciter commutator whereof one set is short-circuited and the other set is connected to the commutating pole windings of the converter, means for driving the exciter in synchronism with the converter, and means for furnishing to the commutating poles of the converter a component of excitation proportional to the current flow in the direct current leads.

In testimony whereof I have hereunto signed my name.

JOSEPH LESTER WOODBRIDGE.

Witnesses:
J. H. TRACY,
R. A. WHETSTONE, Jr.

Copies of this patent may be obtained for five cents each, by addressing the "Commissioner of Patents, Washington, D. C."